United States Patent
Suzuki

(10) Patent No.: US 7,728,890 B2
(45) Date of Patent: *Jun. 1, 2010

(54) PHOTOELECTRIC CONVERSION FILM LAMINATED COLOR SOLID-STATE IMAGING APPARATUS

(75) Inventor: Nobuo Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1190 days.

This patent is subject to a terminal disclaimer.

(21) Appl. No.: 11/253,914

(22) Filed: Oct. 20, 2005

(65) Prior Publication Data

US 2006/0092299 A1    May 4, 2006

(30) Foreign Application Priority Data

Oct. 22, 2004    (JP)    ............................ P.2004-308276

(51) Int. Cl.
H04N 3/14    (2006.01)
(52) U.S. Cl. .................... 348/294; 348/297; 348/272
(58) Field of Classification Search .................. 348/275
See application file for complete search history.

(56) References Cited

U.S. PATENT DOCUMENTS

| | | | |
|---|---|---|---|
| 4,011,016 A * | 3/1977 | Layne et al. ................. | 356/402 |
| 4,581,625 A * | 4/1986 | Gay et al. .................... | 257/444 |
| 6,606,120 B1 * | 8/2003 | Merrill et al. ................. | 348/273 |
| 6,924,167 B1 * | 8/2005 | Hopper et al. ................. | 438/57 |
| 7,515,187 B2 * | 4/2009 | Suzuki ........................ | 348/296 |
| 2004/0179120 A1 * | 9/2004 | Shizukuishi ................. | 348/272 |
| 2005/0206766 A1 * | 9/2005 | Suzuki ........................ | 348/308 |

FOREIGN PATENT DOCUMENTS

| | | |
|---|---|---|
| JP | 2002-502120 A | 1/2002 |
| JP | 2002-83946 A | 3/2002 |
| JP | 2002-513145 A | 5/2002 |
| JP | 2003-332551 A | 11/2003 |

* cited by examiner

*Primary Examiner*—Luong T Nguyen
(74) *Attorney, Agent, or Firm*—Birch, Stewart, Kolasch, Birch, LLP

(57) ABSTRACT

A photoelectric conversion film laminated color solid-state imaging apparatus comprising: a semiconductor substrate in which a first signal read circuit for a first color among the three primary colors, a second signal read circuit for a second color and a third signal read circuit for a third color are formed by MOS transistor circuits, and in which first and second photodiodes for respectively receiving incident light of the first and second colors are formed; a photoelectric conversion film provided above the semiconductor substrate, for receiving incident light of the third color to generate an optical charge; a longitudinal wiring for connecting a pixel electrode film attached to the photoelectric conversion film separately for each pixel to a contact part formed in the semiconductor substrate; and a potential barrier part between the contact part and the third signal read circuit, being formed on the semiconductor substrate.

8 Claims, 7 Drawing Sheets

PHOTOELECTRIC CONVERSION FILM LAMINATED COLOR SOLID-STATE IMAGING APPARATUS

BACKGROUND OF THE INVENTION

1. Filed of the Invention

The present invention relates to photoelectric conversion film laminated color solid-state imaging apparatus that receives the incident light of one color among the three primary colors with photoelectric conversion films laminated on a semiconductor substrate and receives the incident light of the remaining two colors transmitted by the photoelectric conversion film with a photoelectric conversion device formed on the semiconductor substrate, and in particular to photoelectric conversion film laminated color solid-state imaging apparatus that provides good color balance between a color signal obtained from the light received with the photoelectric conversion film and that obtained from the light received with the photoelectric conversion device.

2. Description of the Related Art

Single board type color solid-state imaging apparatus represented by a CCD type or CMOS type image sensor arranges in a mosaic three or four types of color signal filters on an array of pixels to undergo photoelectric conversion. This outputs a color signal from each pixel corresponding to each color filter. Through signal processing of these color signals, a color image is generated.

In the color solid-state imaging apparatus where color filters are arranged in a mosaic, almost two-thirds of the incident light is absorbed by the color filters in case the filters are of the primary colors. This worsens light use efficiency and lowers sensitivity. Another problem is that only a single color signal is obtained for each pixel. Thus, the resulting resolution drops and false colors appear conspicuous.

In order to overcome such problems, imaging apparatus that laminates three layers of photoelectric conversion film on a semiconductor substrate on which a signal read circuit is formed have been studied and developed (for example, refer to JP-T-2002-502120 and JP-A-2002-83946). The imaging apparatus includes for example a pixel structure in which are laminated photoelectric conversion films generating a signal charge (electron, positive hole) from blue (B) light, green (G) light and red (R) light sequentially from an incidence plane. Further, for each pixel, there is provided a read part capable of independently reading a signal charge generated from light at each photoelectric conversion film.

In the case of the imaging apparatus including such a structure, almost all light undergoes photoelectric conversion and read out which means that the use efficiency of visible light is nearly 100 percent and that the color signals of three colors R, G, B are obtained for each pixel. This generates an image with high sensitivity and high resolution (with inconspicuous false colors).

Imaging apparatus described in the JP-T-2002-513145 provides a triple well (photodiode) for detecting an optical signal in a silicon substrate. Depending on the depth of the silicon substrate, signals of different spectrum response (peaked at the wavelength of B (blue), G (green) and R (red) from the surface) are obtained. This takes advantage of the fact that the distance of entry of the incident light into the silicon substrate depends on the wavelength. This imaging apparatus, same as those described in JP-T-2002-502120 and JP-A-2002-83946, obtains an image with high sensitivity and high resolution (with inconspicuous false colors).

The imaging apparatus, described in JP-T-2002-502120 and JP-A-2002-83946 must laminate three layers of photoelectric conversion film on a semiconductor substrate in order and form longitudinal wiring connecting a signal charge per R, G, B generated on each photoelectric conversion film to a signal read circuit formed on the semiconductor substrate. The problem is that this type of imaging apparatus is difficult to manufacture and the corresponding manufacturing yield is low, which results in a higher cost.

In the imaging apparatus described in JP-T-2002-513145, blue light is detected by a photodiode at the shallowest part, red light by a photodiode at the deepest part, and green light by a photodiode at the intermediate part. For example, an optical charge is generated from green light or red light by the photodiode at the shallowest part. Thus, separation of the spectrum response characteristic of R signal, G signal and B signal is not sufficient enough and the resulting color reproducibility is low. Moreover, it is necessary to add or subtract the output signal from each photodiode in order to obtain the true R signal, G signal and B signal. This addition or subtraction process degrades the S/N ratio of the image signal.

In order to solve the problems with the imaging apparatus described in JP-T-2002-502120, JP-A-2002-83946 and JP-T-2002-513145, there has been proposed imaging apparatus described in JP-A-2003-332551. The imaging apparatus is a hybrid type of the incident light described in JP-T-2002-502120 and JP-A-2002-83946 and that described in JP-T-2002-513145. The imaging apparatus includes a single layer of photoelectric conversion film sensitive to green (G) on a semiconductor substrate and receives the incident light of blue (B) and red (R) transmitted by the photoelectric conversion film on a photodiode formed in the semiconductor substrate, same as a related art image sensor.

Since this type of imaging apparatus uses only one layer of photoelectric conversion film, the manufacturing process is simplified thus avoiding an increase in cost and a decrease in the yield. Green light is absorbed by the photoelectric conversion film so that separation of the spectrum response characteristic of the photodiodes for blue light and red light in the semiconductor substrate is improved. This improves color reproducibility and the S/N ratio.

While hybrid type imaging apparatus described in JP-A-2003-332551 is advantageous in terms of reduction of manufacturing cost and improvement of color reproducibility and the S/N ratio, it is accompanied by the problem described below.

As a signal read circuit provide on the semiconductor substrate of the hybrid type imaging apparatus, a CCD type signal read circuit (including a signal transfer path and a transfer electrode) and a CMOS type signal read circuit (including a MOS transistor and signal wiring) are available. In this example, the CMOS type signal read circuit is described.

(1) The photoelectric conversion characteristic of a photoelectric conversion film greatly varies with the electric field in the film (or voltage across terminals of photoelectric conversion film). In case light of the same intensity is incident, it is desirable to accumulate signal charges at a constant rate. In reality, as the signal charges are accumulated in the film, the voltage across the terminals of the film drops thus decreasing the rate of the amount of charges accumulated in the film.

As a result, the proportional relationship between the light intensity and the output signal is lost and the linearity of the photoelectric conversion characteristic is degraded. On the other hand, a photodiode provided on a semiconductor substrate does not present such a problem. Thus, in the hybrid type imaging apparatus, it is difficult to strike a balance between the red light and blue light detected by the photodiode and the green light detected by the photoelectric conversion film, which results in a lower picture quality.

(2) The light transmitted by the photoelectric conversion film includes red (R) light and blue (B) light since green (G) light is absorbed. In case R light and B light are received by a double-layered photodiode formed in a semiconductor substrate, the absorption coefficient of the semiconductor with respect to B light is greater than that of semiconductor with respect to R light. Thus, a photodiode closer to the surface of the semiconductor substrate has a relatively higher sensitivity to B light while a photodiode at a deeper part has a relatively higher sensitivity to R light.

Because the light incident on each photodiode contains no G light, color separation between R and B is improved although color separation is not good enough as far as the difference of the light absorption coefficient of a semiconductor substrate is used. For example, red light incident on a photodiode for blue color generates an optical charge thus failing to obtain acceptable color reproducibility.

SUMMARY OF THE INVENTION

A first object of the invention is to provide hybrid type photoelectric conversion film laminated color solid-state imaging apparatus having a CMOS type signal read circuit that shows favorable linearity of photoelectric conversion characteristic of a photoelectric conversion film.

A second object of the invention is to provide hybrid type photoelectric conversion film laminated color solid-state imaging apparatus having a CMOS type signal read circuit that improves color separation between red color (R) and blue color (B) to obtain good color reproducibility.

Photoelectric conversion film laminated color solid-state imaging apparatus according to the invention comprises: a semiconductor substrate in which a first signal read circuit for a first color among the three primary colors, a second signal read circuit for a second color and a third signal read circuit for a third color are formed by MOS transistor circuits, and in which a first photodiode for receiving incident light of the first color and a second photodiode for receiving incident light of the second color are formed; a photoelectric conversion film provided above the semiconductor substrate, the photoelectric conversion film receiving incident light of the third color to generate an optical charge; a longitudinal wiring for connecting a pixel electrode film attached to the photoelectric conversion film separately for each pixel to a contact part formed in the semiconductor substrate; and a potential barrier part between the contact part and the third signal read circuit, the potential barrier part being formed on the semiconductor substrate.

With this configuration, the film potential of the photoelectric conversion film is maintained at a constant voltage even in case optical charges generated by the incident light of the third color are accumulated thus keeping constant the average electric field in the film. This prevents degradation of linearity of the photoelectric conversion characteristic and strikes a color balance between the third color and the first and second colors.

The signal read circuit of the photoelectric conversion film laminated color solid-state imaging apparatus according to the invention may comprise an output transistor for converting a signal charge to a voltage signal, a row selection transistor, and a reset transistor for resetting a signal charge.

With this configuration, a well-known signal read circuit including three transistors is made available.

The potential barrier part of the photoelectric conversion film laminated color solid-state imaging apparatus according to the invention may be a potential barrier transistor, wherein a source of the potential barrier transistor is formed as the contact part, a drain of the potential barrier transistor is electrically connected to the third signal read circuit, and a gate of the potential barrier transistor is connected to a DC power supply.

With this configuration, it is possible to manufacture a potential barrier part by way of a known transistor structure for easy manufacture of the potential barrier part.

The photoelectric conversion film laminated color solid-state imaging apparatus according to the invention may further comprise an electric charge accumulating section provided between the potential barrier part and the third signal read circuit.

With this configuration, it is possible to rapidly move the optical charges generated on the photoelectric conversion film to the electric charge accumulating part.

The photoelectric conversion film laminated color solid-state imaging apparatus according to the invention may comprise:
a three-layer structure including:
a first semiconductor layer of conductively type for accumulating a signal charge flowing from the longitudinal wiring via the contact part;
a second semiconductor layer of conductively type opposite to that of the first conductivity type, the second semiconductor layer provided on the first semiconductor layer;
a third semiconductor layer of conductively type opposite to that of the first conductivity type, the third semiconductor layer provided under the first semiconductor layer; and
a read transistor between the three-layer structure and the third signal read circuit,
wherein the first semiconductor layer comprises: a first portion whose thickness is smaller or whose impurity density is lower; and a second portion whose thickness is larger or whose impurity density is larger than that of the first portion,
the potential barrier part comprises the first portion of the first semiconductor layer, and
the electric charge accumulating part comprises the second portion of the first semiconductor layer, and wherein a terminal on the side of the potential barrier part of the first semiconductor layer is electrically connected to the contact part, and a terminal on the side of the electric charge accumulating part of the first semiconductor layer is electrically connected to a source of the read transistor.

With this configuration also, the optical charges generated by the incident light of the third color rapidly move to the electric charge accumulating part and the potential of the film is kept constant, without degradation of the linearity of the photoelectric conversion characteristic.

In the photoelectric conversion film laminated color solid-state imaging apparatus according to the invention, the first photodiode and the second photodiode may be laminated in a direction of depth of the semiconductor substrate.

With this configuration, it is possible to obtain on a single light receiving part signals of the three primary colors, the first color, the second color and the third color. It is thus possible to obtain a high-resolution image with high sensitivity and inconspicuous false colors.

In the photoelectric conversion film laminated color solid-state imaging apparatus according to the invention, the first photodiode and the second photodiode may be arranged in a checkered pattern on a surface of the semiconductor substrate, wherein a first color filter transmitting the incident light of the first light and blocking the incident light of the second light is provided above the first photodiode, and a second color filter transmitting the incident light of the second light and blocking the incident light of the first light is provided above the second photodiode.

With this configuration, the color separation performance between the first color and the second color is improved thus enhancing the color reproducibility of an image.

In the photoelectric conversion film laminated color solid-state imaging apparatus according to the invention, the first, second, third colors may be blue, red and green, respectively.

With this configuration, it is possible to provide more number of pixels of green color available as a luminance signal, thereby obtaining an image with a high sensitivity and a high resolution.

With this configuration, a potential barrier region that behaves as a potential barrier to the signal charges of pixels composed of a photoelectric conversion film. This keeps constant the terminal voltage of the photoelectric conversion film irrespective of the amount of accumulated signal charge, thus preventing degradation of linearity of the photoelectric conversion characteristic as well as loss of color balance. Further, color reproducibility is enhanced through color separation using a color filter.

DETAILED DESCRIPTION OF THE INVENTION

An embodiment of the invention will be described referring to drawings.

First Embodiment

Figure 1:
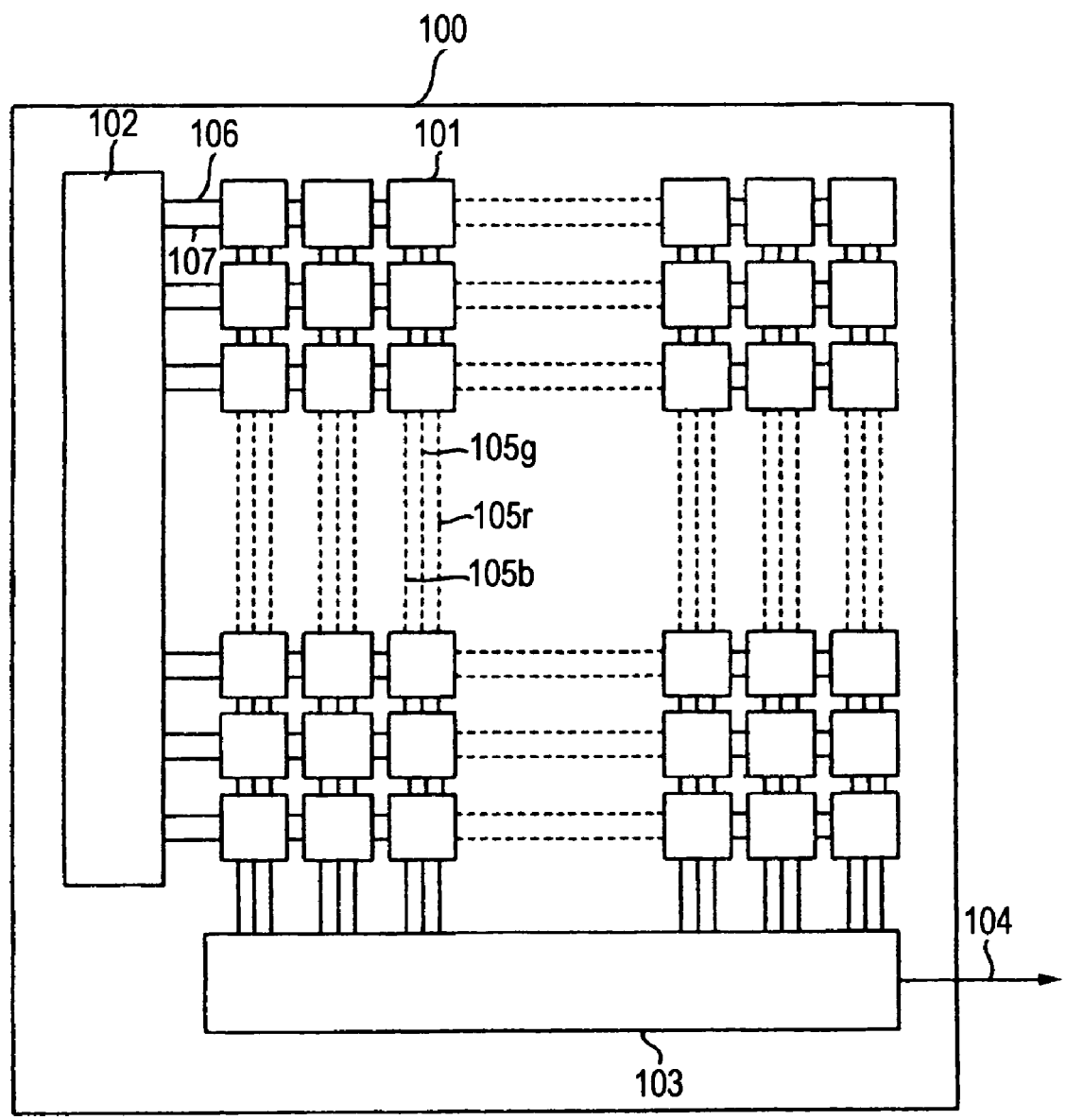
FIG. 1 is a surface schematic view of photoelectric conversion film laminated color solid-state imaging apparatus according to the first embodiment of the invention.

FIG. 1 is a surface schematic view of photoelectric conversion film laminated color solid-state imaging apparatus according to the first embodiment of the invention. The photoelectric conversion film laminated color solid-state imaging apparatus 100 includes a large number of light receiving parts 101 in a tetragonal lattice in this example. On the surface of a semiconductor substrate of the photoelectric conversion film laminated color solid-state imaging apparatus 100 are formed a photodiode for detecting blue light and a photodiode for detecting red light mentioned later as well as a signal read circuit composed of a MOS transistor circuit by using a circuit integration technique. In the upper layer of the semiconductor substrate are laminated a photoelectric conversion film by way of a film forming technique.

Three signal read circuits provided for the light receiving parts 101 are interconnected via a row selection scan circuit 102, a row selection signal line 106 and a reset signal line 107. The signal read circuits and an image signal output part 103 are interconnected via column signal (image signal) lines 105r, 105g, 105b and an output signal 104 is output from the image signal output part 103.

The image signal output part 103 may output as analog signals image signals of red color (R), green color (G), blue color (B) captured from the column signal (image signal) lines 105r, 105g, 105b or may convert an image signal to a digital signal and output the resulting digital signal.

The subscripts r, g, b used herein correspond to the red color (R), green color (G), blue color (B) that are colors of incident light to be detected.

Figure 2:
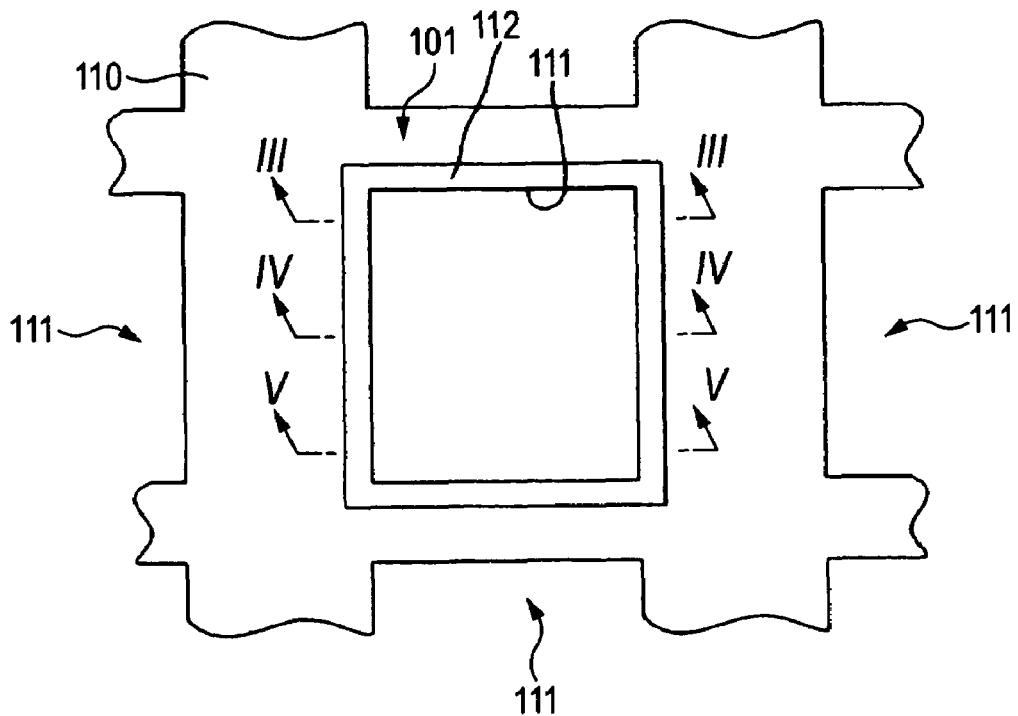
FIG. 2 is an expanded schematic view of the light receiving part shown in FIG. 1.

FIG. 2 is an expanded schematic view of the light receiving part 101 shown in FIG. 1. A light shielding film 110 has a large number of rectangular openings 111 arranged in a matrix. At the position of each opening 111 is fitted onto the opening 111 a pixel electrode film 112 mentioned later that is slightly wider than the opening 111. The position of each opening 111 serves as a light receiving part 101 shown in FIG. 1.

Figure 3:
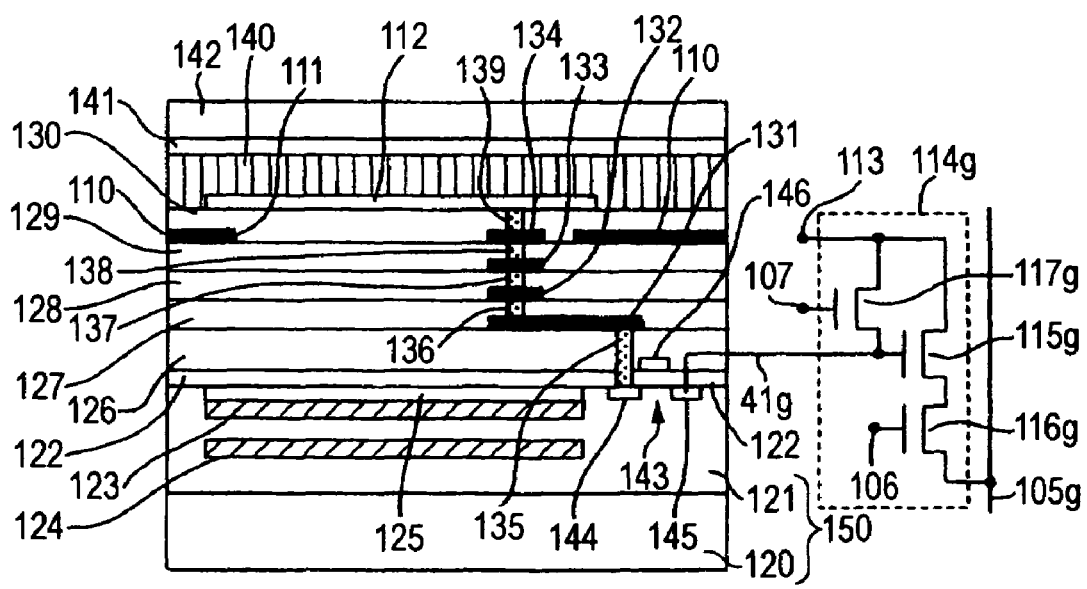
FIG. 3 is a cross-sectional view taken on the line III-III in FIG. 2.
Figure 4:
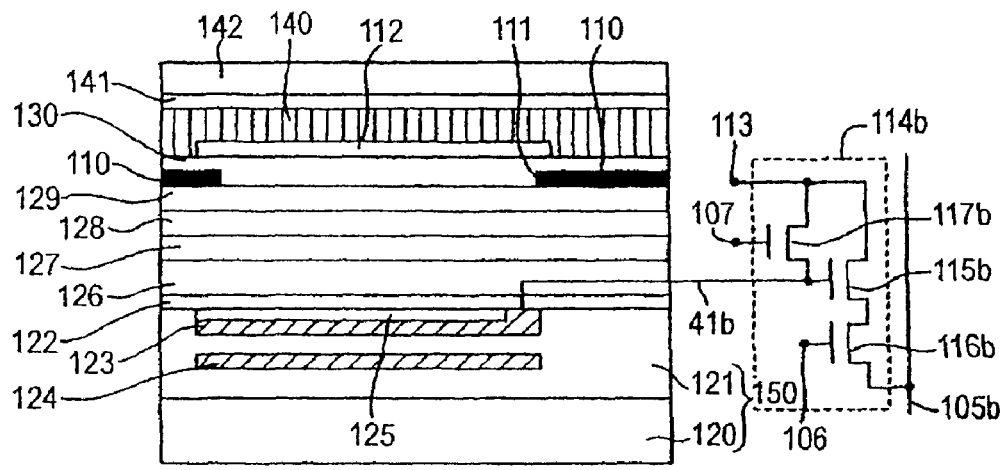
FIG. 4 is a cross-sectional view taken on the line IV-IV in FIG. 2.
Figure 5:
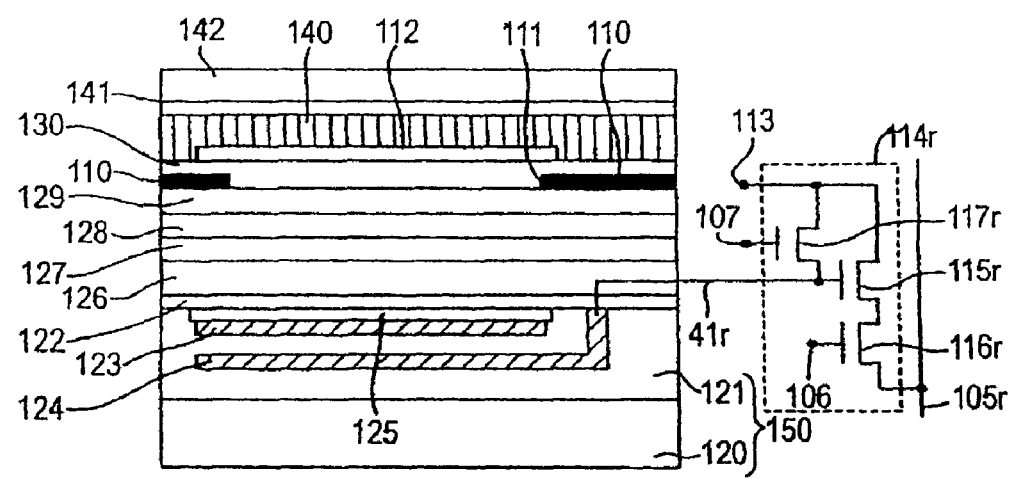
FIG. 5 is cross-sectional view taken on the line V-V in FIG. 2.

FIG. 3 is a cross-sectional view taken on the line III-III in FIG. 2. FIG. 4 is a cross-sectional view taken on the line IV-IV in FIG. 2. FIG. 5 is cross-sectional view taken on the line V-V in FIG. 2. While FIGS. 3, 4 and 5 do not show the cross section of each of the CMOS type signal read circuits 114g, 114b, 114r, they include respective equivalent circuit diagrams.

A semiconductor substrate 150 comprises an n-type semiconductor substrate 120 and a p-well layer 121 formed on a surface of the n-type semiconductor substrate 120. At a deep part in the p-well layer 121 is formed an n-type semiconductor layer 124. At a shallow part in the p-well layer 121 is formed an n-type semiconductor layer 123 placed apart from the n-type semiconductor layer 124. On the surface of the n-type semiconductor layer 123 is formed a p$^+$ layer 125. On the outermost surface of the semiconductor substrate 150 is formed a gate insulation film 122.

On the gate insulation film 122 are laminated four transparent insulation layers 126 through 129 in order from the substrate 150. On the transparent insulation layers 129 in the upper layer is formed a light shielding film 110 described referring to FIG. 2. The light shielding film 110 has openings 111 (refer to FIG. 2) being aligned at positions above the n-type semiconductor layers 124, 123.

Between the layers of the four transparent insulation layers 126 through 129 covered by the light shielding film 110 are formed the row selection signal line 106, the reset signal line 107, the column signal lines 105r, 105g, 105b, and the power supply line. This is because the signal read circuit is manufactured with a four-layer metal structure.

As shown in FIG. 5, the n-type semiconductor layer 124 is brought up to a surface position reaching the gate insulation film 122 at an end position covered by the light shielding film 110, and is connected to the signal read circuit 114r by way of signal wiring 41r. As shown in FIG. 4, the n-type semiconductor layer 123 is connected to the signal read circuit 114b by way of signal wiring 41b.

The signal read circuits 114g, 114b, 114r shown by equivalent circuit diagrams of FIGS. 3, 4 and 5 are composed of known MOS transistors including a source region and drain region (not shown) formed in the p-well layer 121 of the semiconductor substrate and a gate electrode film formed on the gage insulation film 122. The signal read circuits 114g, 114b, 114r are formed at positions covered by the light shielding film 110. By covering a signal read circuit with the light shielding film 110, it is possible to avoid color mixture caused by the entry of light into a signal read circuit.

A transparent insulation film 130 is laminated on the light shielding film 110. At a position above the opening 111 on the transparent insulation film 130 is formed a pixel electrode film 112 that is slightly wider than the opening 111. The pixel electrode film 112 is formed by an optically transparent material or a material with little light absorption. For example, a metal compound such as ITO or a very thin metal film is used for this purpose.

On each pixel electrode film 112 for each light receiving part 101 is laminated a single-layer photoelectric conversion film 140 common to all light receiving parts 101. The photoelectric conversion film 140 has sensitivity to light mainly in the wave range of green color (G) and generates optical charges corresponding to the amount of incident light of green color. The photoelectric conversion film 140 may be of a single-layer structure or a multilayer structure. The photoelectric conversion film 140 is formed by an inorganic material such as silicon, compound semiconductor and nano-particles thereof, an organic semiconductor material, or an organic or inorganic material containing an organic coloring agent.

On the photoelectric conversion film 140 is formed a transparent common electrode film (counter electrode film opposed to each pixel electrode film 112) 141. On the electrode film 141 is formed a transparent protective film 142. The counter electrode film 141 may be a single-layer film electrode common to all receiving parts 101. Or, the counter electrode film 141 may be formed by rectangular electrode film segments connected by common wiring, same as the pixel electrode film 112. A material of the photoelectric conversion film 140 may be a metal compound such as ITO or a very thin metal film. Note that the material should be an optically transparent material or a material with little light absorption.

A region segmented by each pixel electrode film 112 is a G pixel. A p-n junction formed between the n-type semiconductor layer 123 and the p-well layer 121 that is arranged beneath the same constitutes a photodiode (photoelectric conversion device) The photodiode is close to the surface of the semiconductor substrate 150 so that it serves as a B pixel that shows a large absorption coefficient of blue (B) light having a short wavelength and is sensitive to B light.

A p-n junction formed between the n-type semiconductor layer 124 and the p-well layer 121 that is arranged over/beneath the same also constitutes a photodiode. The photodiode is located in a deep part of the semiconductor substrate 150. Thus, the component of red (R) light having a small light absorption coefficient is dominant in the light reaching the photodiode. As a result, the photoelectric conversion film works as an R pixel.

The center of the R pixel, the center of the G pixel, the center of the B pixel and the center of the opening in each light receiving part 101 are desirably manufactured so that they are aligned in the vertical direction (direction of incident light) of the semiconductor substrate 150.

In order to connect the pixel electrode 112 and the signal read circuit 114g for green color formed on the surface of the semiconductor substrate 150, each of the metal films for longitudinal wiring connection 131 through 134 is provided between adjacent pairs of the transparent insulation films 126 through 130. Longitudinal wiring 135 through 139 are provided penetrating the transparent insulation films 126 through 130. The longitudinal wiring 135 through 139 is formed for example by a plug made of tungsten W or copper Cu.

The longitudinal wiring 135 through 139 is provided in the corners of the opening 111. The final longitudinal wiring 135 connected to the surface of the semiconductor substrate 120 is provided in a position where incident light does not impinge by extending the metal film for longitudinal wiring connection 131 to a position not covered by the light shielding film 110.

The photoelectric conversion film laminated color solid-state imaging apparatus according to this embodiment includes a potential barrier transistor 143 between the final longitudinal wiring 135 and the signal read circuit 114g for detecting green color.

The potential barrier transistor 143 is composed of a source region 144 and a drain region 145 formed on the surface of the p-well layer of the semiconductor substrate 150 and a gate electrode film 146 across the source region 144 and the drain region 145 via the gate insulation film 122. The longitudinal wiring 135 is connected to the source region 144 and the drain region 145 is connected to the signal read circuit 114g via the wiring 41g. That is, the source region 144 serves as a contact part of the longitudinal wiring 135.

The signal read circuits 114r, 114g, 114b are respectively composed of a same three-transistor configuration. Connection of the signal read circuit 114g will be described as an example.

The drain of an output transistor 115g is connected to a DC power supply line 113. The gate of the output transistor 115g is connected to the drain 145 of the potential barrier transistor 143 via wiring 41g. The drain of a row selection transistor 116g is connected to the source of the output transistor 115g. The source of the row selection transistor 116g is connected to a column signal line 105g and the gate of the row selection transistor 116g is connected to a row selection signal line 106. The drain of a reset transistor 117g is connected to a DC power supply line 113 and the source of the reset transistor 117g is connected to the gate of the output transistor 115g. The gate of the reset transistor 117g is connected to a reset signal line 107.

In the signal read circuit 114b, the gate of the output transistor 115b is connected to an n-type semiconductor layer 123 via wiring 41b. In the signal read circuit 114r, the gate of the output transistor 115r is connected to an n-type semiconductor layer 124 via wiring 41r.

The photoelectric conversion film laminated color solid-state imaging apparatus according to this embodiment is configured as mentioned above. When light from a subject is incident on the photoelectric conversion film 140, signal charges corresponding to the amount of green light of the incident light are generated on the photoelectric conversion film 140. The signal charges flow from the pixel electrode film 112 to the source region 144 on the semiconductor substrate via longitudinal wiring 139, 138, 137, 136, 135 and are accumulated on the gate of the output transistor 115g via the potential barrier transistor 143. As a result, a signal corresponding to the amount of signal charge of green color is read by the signal read circuit 114g.

The blue light and red light of incident light passes through the photoelectric conversion film 140 and reaches the semiconductor substrate via the opening 111 of the light shielding film 110. The blue light having a short wavelength is absorbed by the surface of the semiconductor substrate. Signal charges are generated by a photodiode provided in this part and are accumulated on the gate of the output transistor 115b. As a result, a signal corresponding to the amount of signal charge of blue light is read by the signal read circuit 114b.

The red light having a long wavelength reaches a deep part of the semiconductor substrate. Signal charges are generated by a photodiode provided in this part and are accumulated on the gate of the output transistor 115r. As a result, a signal corresponding to the amount of signal charge of red color is read by the signal read circuit 114r.

The photoelectric conversion film laminated color solid-state imaging apparatus according to this embodiment includes a potential barrier transistor 143 before the gate of the output transistor 115g to which signal charges generated on the photoelectric conversion film 140 are carried via longitudinal wiring. The potential barrier transistor works as follows:

Applying a DC voltage to the gate 146 of the potential barrier transistor 143 via wiring (not shown) keeps constant the channel potential below the gate 146, which causes the channel to work as a potential barrier part.

Signal charges of G pixel generated when light is incident on the photoelectric conversion film 140 flow into the gate of the output transistor 115g via the channel (potential barrier part) below the gate of the potential barrier transistor 143 and accumulated thereon. In the related art, as the signal charges are accumulated, the film potential of the photoelectric conversion film 140 varies. In this embodiment, the voltage of the electrode film 112 of G pixel is fixed to around the voltage V1 of the potential barrier part irrespective of the amount of charges accumulated on the gate of the output transistor 115g because of the presence of a potential barrier part.

Thus, in the photoelectric conversion film laminated color solid-state imaging apparatus according to this embodiment, assuming that the voltage across film terminals to provide favorable photoelectric conversion characteristic at the photoelectric conversion film 140 is V2, applying a voltage of (V1+V2) to the common electrode film 141 causes the photoelectric conversion film 140 to reliably perform favorable photoelectric conversion irrespective of the amount of electric charges accumulated on the gate of the transistor 115g. This improves the linearity between the intensity of light incidence to the photoelectric conversion film 140 and the intensity of an output signal from the photoelectric conversion film 140. This avoids loss of color balance between the red color signal and blue color signal detected on the R and B pixels provided on the semiconductor substrate 120 and the green color signal detected by the photoelectric conversion film 140, thereby providing a favorable image.

It is natural that the value of a DC voltage to be applied and the doping amount of the implantation of impurities into the channel part should be selected in advance in order to obtain a desired value of potential barrier at the potential barrier part. While the potential barrier part is a MOS transistor 143 in this embodiment, a junction-type transistor may be used instead.

Second Embodiment

Figure 6:
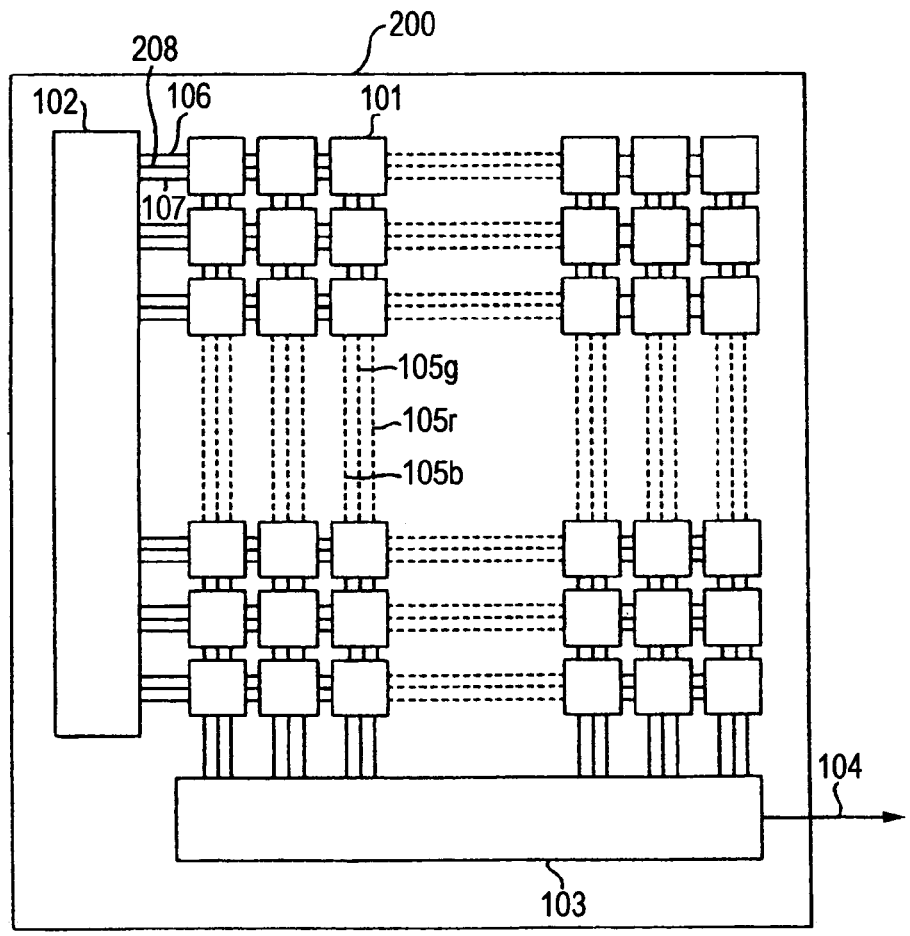
FIG. 6 is a surface schematic view of photoelectric conversion film laminated color solid-state imaging apparatus according to the second embodiment of the invention.

FIG. 6 is a surface schematic view of photoelectric conversion film laminated color solid-state imaging apparatus 200 according to the second embodiment of the invention. The photoelectric conversion film laminated color solid-state imaging apparatus 200 differs from the photoelectric conversion film laminated color solid-state imaging apparatus 100 according to the first embodiment of the invention shown in FIG. 1 in that a read signal line 208 connecting a signal read circuit for each light receiving part 101 to a row selection scan part 102 is added.

Figure 7:
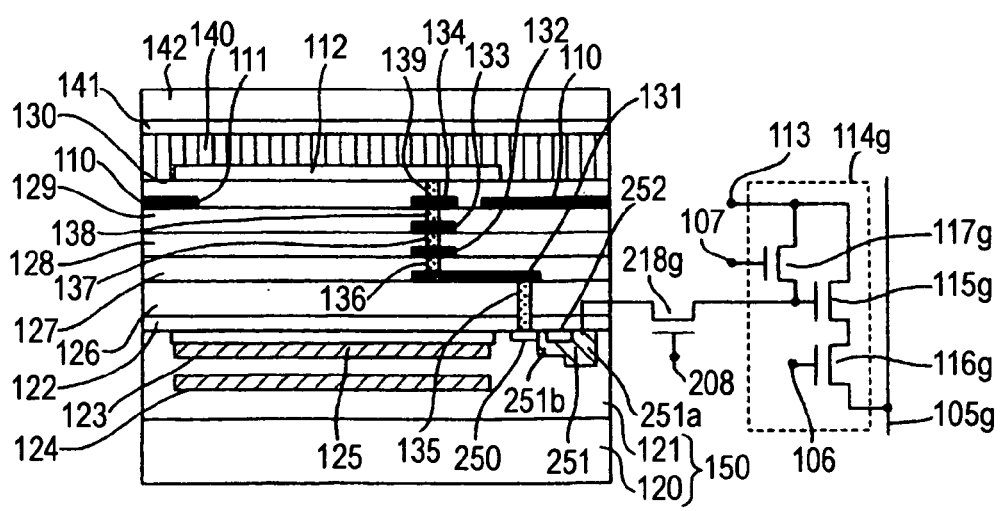
FIG. 7 is a surface schematic view of the part corresponding to FIG. 3 of the photoelectric conversion film laminated color solid-state imaging apparatus shown in FIG. 6.
Figure 8:
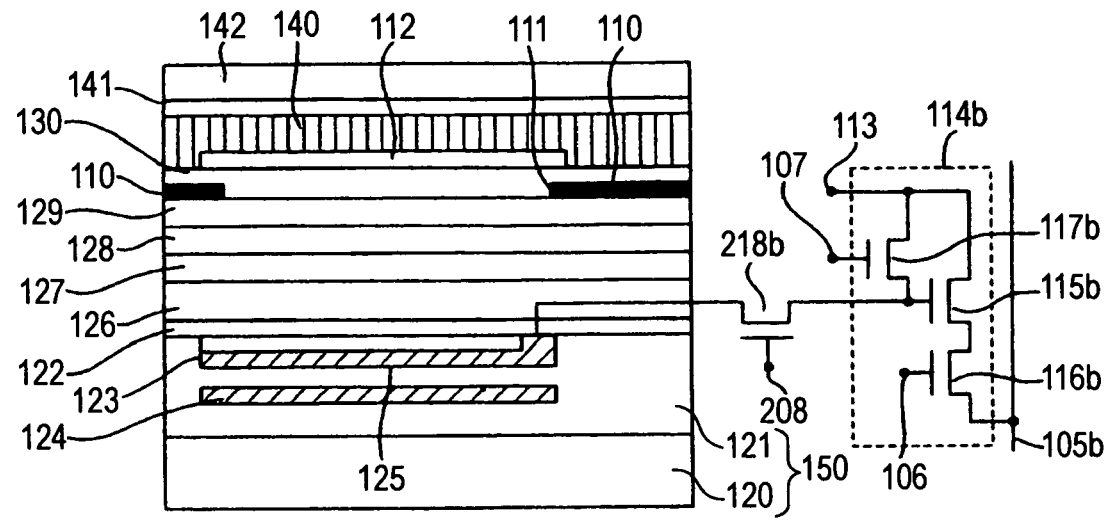
FIG. 8 is a surface schematic view of the part corresponding to FIG. 4 of the photoelectric conversion film laminated color solid-state imaging apparatus shown in FIG. 6.
Figure 9:
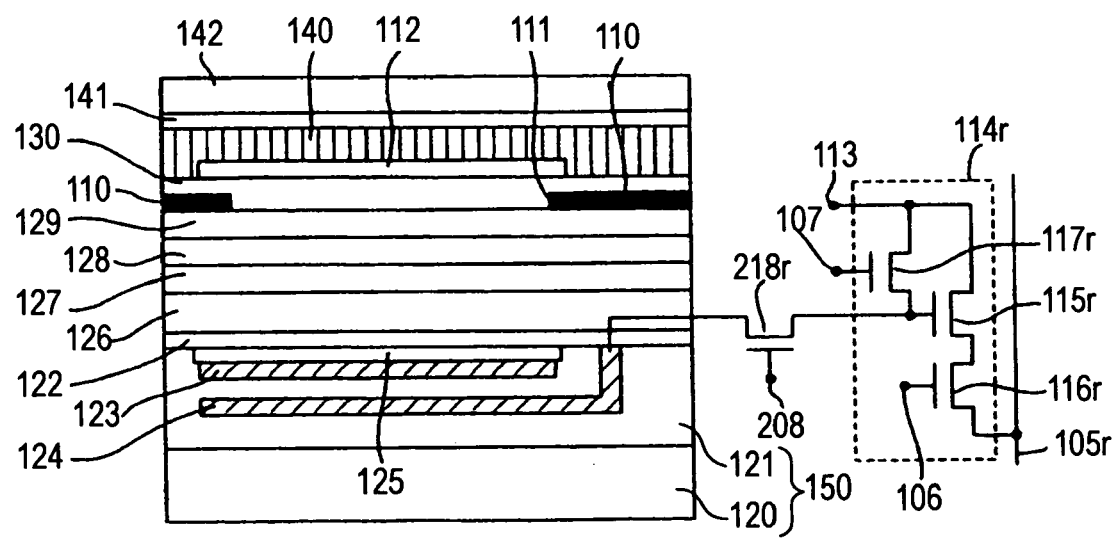
FIG. 9 is a surface schematic view of the part corresponding to FIG. 5 of the photoelectric conversion film laminated color solid-state imaging apparatus shown in FIG. 6.

FIGS. 7, 8 and 9 are respectively schematic cross-sectional views of the imaging apparatus according to this embodiment corresponding to FIGS. 3, 4 and 5 according to the first embodiment. A same sign is given to a same member as the first embodiment and the corresponding description is omitted.

In this embodiment, a potential barrier part 251b of a separate structure is provided in place of the potential barrier transistor described referring to FIG. 1. Read transistors 218r, 218g, 218b are interposed between the bases of the output transistors 115r, 115g, 115b for the signal read circuits 114r, 114g, 114b in order to provide a four-transistor configuration. Further, a read signal line 208 is connected to each base of each of the read transistors.

In this embodiment, as shown in FIG. 7, an n-type semiconductor layer 251 is provided adjacent to a contact $n^+$-type semiconductor layer 250 which is provided on the surface of the p-well layer 121 and to which longitudinal wiring 135 is connected. On the surface of the n-type semiconductor layer 251 is provided a $p^+$-type semiconductor layer 252.

Namely, in this area of the semiconductor substrate 150, there is formed a three-layer structure including the n-type semiconductor layer 251, the $p^+$-type semiconductor layer 252 provided on the n-type semiconductor layer 251, and the p-well layer 121 provided under the n-type semiconductor layer 251.

The n-type semiconductor layer 251 has a part whose layer thickness is small (or a part where the impurity density is lower) 251b close to the contact $n^+$-type semiconductor layer 250 and a part whose thickness is large (or a part where the impurity density is higher) 251a on the side the source of the read transistor 218g is connected. The part 251b works as a potential barrier part because its potential well is shallow. The part 251a works as a signal charge accumulating part because its potential well is deep.

In the photoelectric conversion film laminated color solid-state imaging apparatus according to this embodiment, signal charges of G pixel are accumulated in the electric charge accumulating part 251a via the potential barrier part 251b. Thus, the voltage of the pixel electrode film 112 is fixed to around the voltage V1 of the potential barrier part 251b irrespective of the amount of charges accumulated on the electric charge accumulating part 251a.

Thus, assuming that the voltage across photoelectric conversion film terminals to provide favorable photoelectric conversion characteristic is V2, applying a voltage of (V1+V2) to the counter electrode film 141 reliably performs favorable photoelectric conversion irrespective of the amount of electric charges accumulated, thereby improving the linearity of the photoelectric conversion characteristic.

In this embodiment, the signal read circuit includes four transistors. When the row selection scan part 102 outputs an ON signal to the read signal line 208 to turn on the read transistor 218, the signal charges are carried from the electric charge accumulating part 251a to the gate of the output transistor 115. It is thus possible to subtract from a signal in pre-reset state (kTC noise) the signal overlaid by another signal (kTC noise+signal), which improves the resulting S/N ratio.

While the potential barrier part 251b and the electric charge accumulating part 251a are provided in a structure similar to that of a buried photodiode with small dark current in this embodiment, the invention is not limited thereto but a variety of methods may be used to provide a potential barrier part and an electric charge accumulating part. For example, a potential barrier part may be a MOS type transistor same as the first embodiment and an electric charge accumulating part may be a general pn-joint diode or a MOS type capacitor.

Third Embodiment

Figure 10:
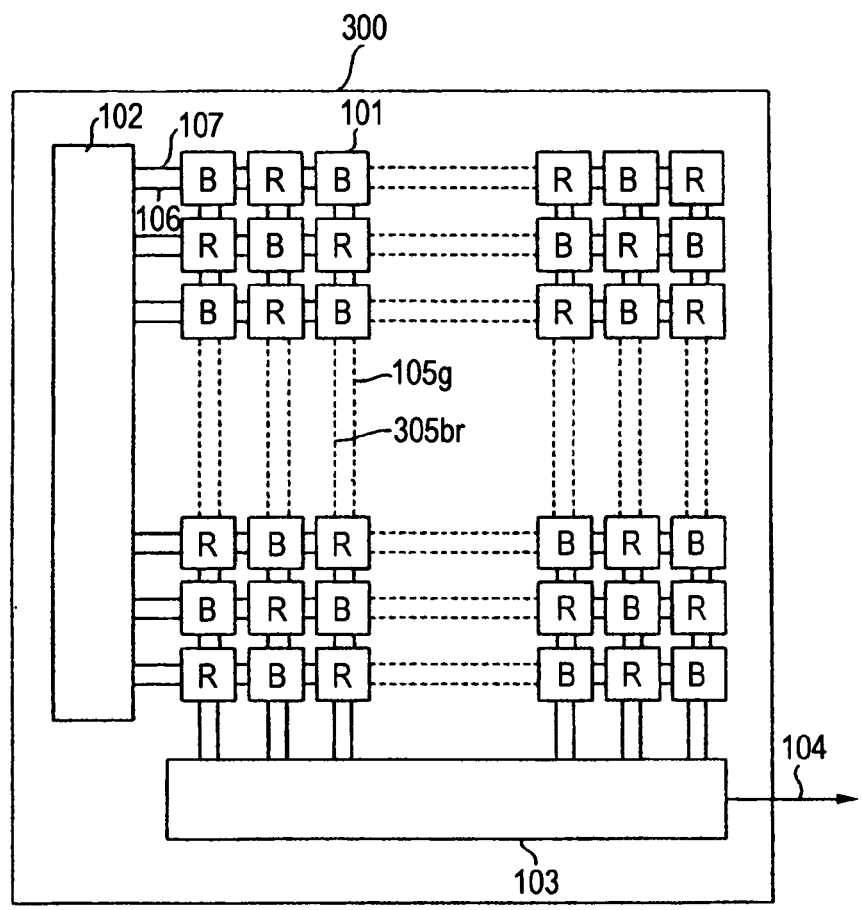
FIG. 10 is a surface schematic view of photoelectric conversion film laminated color solid-state imaging apparatus according to the third embodiment of the invention.

FIG. 10 is a surface schematic view of photoelectric conversion film laminated color solid-state imaging apparatus according to the third embodiment of the invention. While two n-type semiconductor layers 123, 124 are provided in the direction of depth of the semiconductor substrate and a blue color signal and a red color signal are separately detected by taking advantage of the wavelength dependency of the distance of entry of light in the first embodiment shown in FIG. 1, a color filter is used to separate a red color signal from a blue color signal to enhance the color separation performance, same as the related art practices. A red filter is formed at a light receiving part 101 bearing "R" in FIG. 1 and a blue filter is formed at a light receiving part 101 bearing "B".

In this embodiment, a single light receiving part 101 is used to detect two colors of green and blue, and another light receiving part 101 adjacent thereto is used to detect two colors of green and red. Only two column signal lines, that is, an image signal line 105g for green color and an image signal line 305br for blue color and red color, are required.

Figure 11:
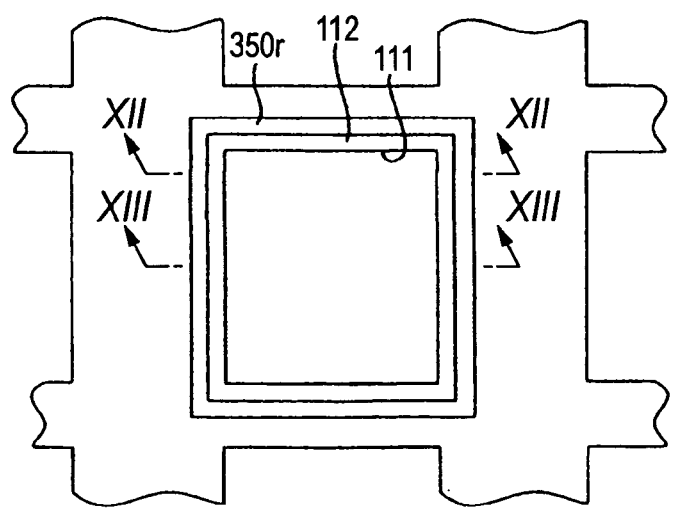
FIG. 11 is an enlarged schematic view of the light receiving part show in FIG. 10.

FIG. 11 is an enlarged schematic view of the light receiving part. In this embodiment, a red filter 350r is provided at the opening 111 of a light shielding film 110 and a blue filter (not shown) is provided at the opening 111 of an adjacent light shielding film.

Figure 12:
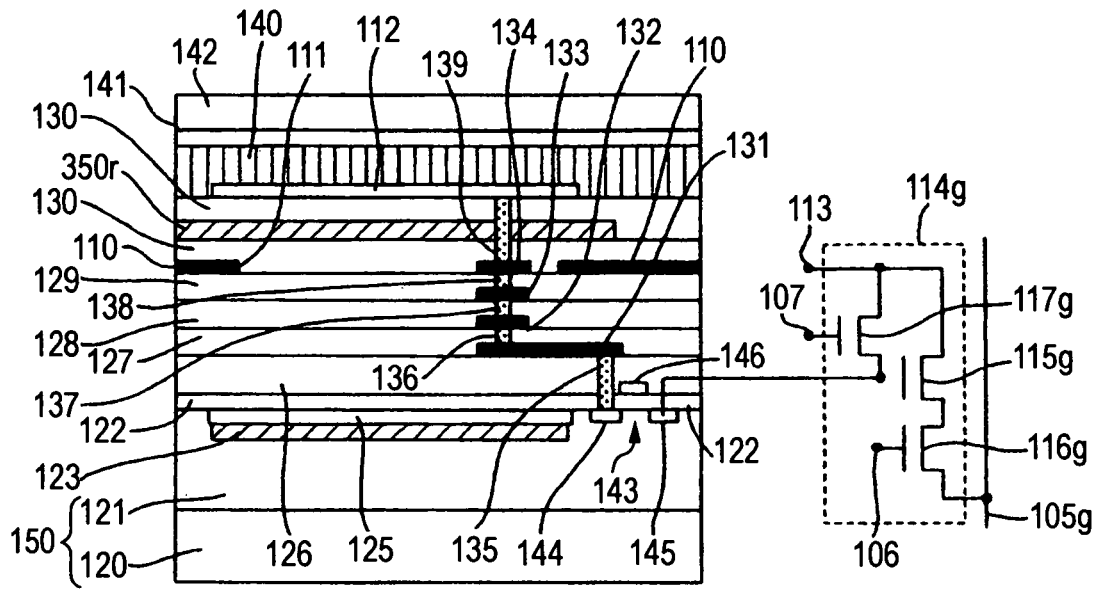
FIG. 12 is a cross-sectional view taken on the line XII-XII in FIG. 11.
Figure 13:
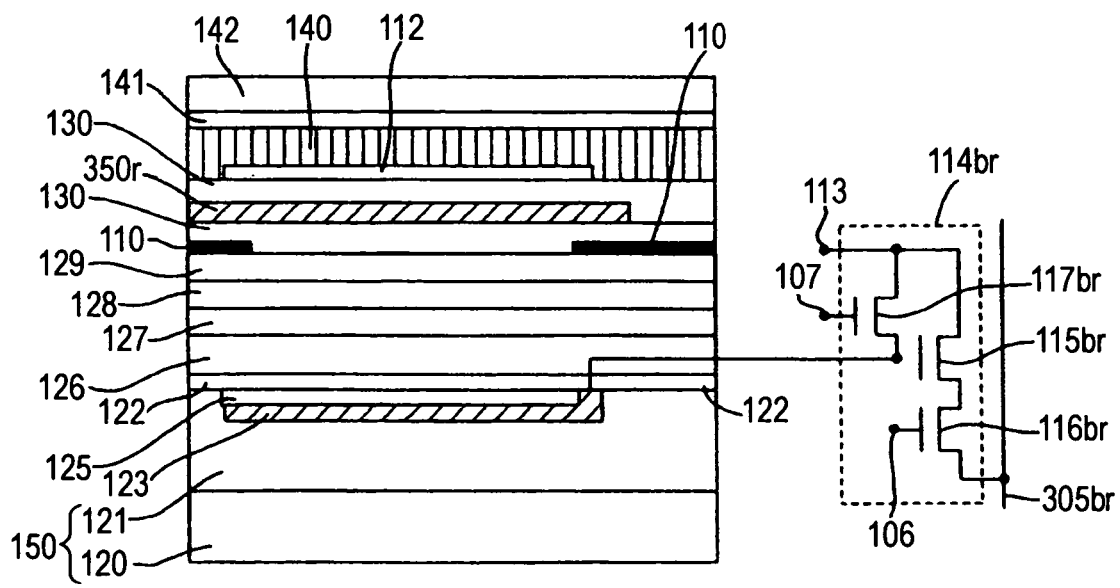
FIG. 13 is a cross-sectional view taken on the line XIII-XIII in FIG. 11.

FIG. 12 is a cross-sectional view taken on the line XII-XII in FIG. 11. FIG. 13 is a cross-sectional view taken on the line XIII-XIII in FIG. 11. A same sign is given to a same member as the first embodiment and the corresponding description is omitted.

This embodiment differs from the first embodiment in that a red color filter 350r is provided in the transparent insulation film 130. The light receiving part 101 for detecting a red color signal need not separately detect red color and blue color, so that an n-type semiconductor layer 124 is not provided. The light receiving part 101 for detecting blue color and green color is the same as that in FIGS. 12 and 13 except that a blue filter is provided in place of the red filter 350r shown in FIGS. 12 and 13.

According to the embodiment, blue light is intercepted for an R pixel by an optical filter and red light is intercepted for a B pixel. This improves color separation between red color and blue color and color reproducibility with respect to the first embodiment.

A general red filter intercepts blue light and green light and transmits red light. The light passing through the photoelectric conversion film 140 has a smaller green light component. Thus, a red filter used in this embodiment only need to intercept blue light. Similarly, a blue filter used only need to intercept red light.

While the signal read circuit is of a three-transistor structure in the example shown, it may be of a four-transistor structure, same as the second embodiment. While the structure of the potential barrier part is the same as that in the first embodiment, the invention is not limited thereto, as mentioned above.

While an optical filter is provide between the pixel electrode film 112 and the light shielding film 110 in the third embodiment, it may be provided on the upper surface of the counter electrode film 141. In this case, green light (G) must reach the photoelectric conversion film 140. Thus, it is necessary to provide an optical filter transmitting B light and G light for a B pixel and an optical filter transmitting R light and G light for an R pixel.

In the third embodiment, the number of G signals is double that of R signals or B signals thus obtaining a high-resolution image while complicating the signal processing. To offset this, the same number of RGB signals may be used and pixel electrode films 112 at a B pixel and an R signal adjacent to each other may be wired in common and corresponding signals may be read while a G pixel signal is being added, in order to simplify the signal processing.

Moreover, for each of the embodiments, a microlens may be provided on each light receiving part 101 to enhance the light-gathering efficiency. This elevates the sensitivity of pixels, in particular a B pixel and an R pixel.

According to the foregoing embodiments, a potential barrier region acting as a potential barrier to a signal charge is provided on the pixel electrode of a G pixel composed of a photoelectric conversion film. Thus, a constant terminal voltage (internally constant average electric field) is maintained on the photoelectric conversion film irrespective of the amount of the accumulated signal charges, thereby allowing signal charges generated in the film to rapidly move from the film to the electric charge accumulating part. This prevents degradation of linearity of the photoelectric conversion characteristic and loss of color balance.

Color filters are used to separate blue color from red color, which enhances the color reproducibility.

The photoelectric conversion film laminated color solid-state imaging apparatus according to the invention promises easy manufacture and a high manufacturing yield, so that it is useful as a color solid-state imaging apparatus that replaces a related art CCD type or CMOS type image sensor.

The entire disclosure of each and every foreign patent application from which the benefit of foreign priority has been claimed in the present application is incorporated herein by reference, as if fully set forth.

What is claimed is:

1. A photoelectric conversion film laminated color solid-state imaging apparatus comprising:

a semiconductor substrate in which a first signal read circuit for a first color among the three primary colors, a second signal read circuit for a second color and a third signal read circuit for a third color are formed by MOS transistor circuits, and in which a first photodiode for receiving incident light of the first color and a second photodiode for receiving incident light of the second color are formed;

a photoelectric conversion film provided above the semiconductor substrate, the photoelectric conversion film receiving incident light of the third color to generate an optical charge;

a longitudinal wiring for connecting a pixel electrode film attached to the photoelectric conversion film separately for each pixel to a contact part formed in the semiconductor substrate; and a potential barrier part between the contact part and the third signal read circuit, the potential barrier part being formed on the semiconductor substrate.

2. The photoelectric conversion film laminated color solid-state imaging apparatus according to claim 1, wherein each of the first signal read circuit, the second signal read circuit and the third signal read circuit comprises an output transistor for converting a signal charge to a voltage signal, a row selection transistor, and a reset transistor for resetting the signal charge.

3. The photoelectric conversion film laminated color solid-state imaging apparatus according to claim 1,
wherein the potential barrier part is a potential barrier transistor,
a source of the potential barrier transistor is formed as the contact part,
a drain of the potential barrier transistor is electrically connected to the third signal read circuit, and
a gate of the potential barrier transistor is connected to a DC power supply.

4. The photoelectric conversion film laminated color solid-state imaging apparatus according to claim 1, further comprising
an electric charge accumulating section provided between the potential barrier part and the third signal read circuit.

5. The photoelectric conversion film laminated color solid-state imaging apparatus according to claim 4, comprising:
a three-layer structure including:
a first semiconductor layer of a first conductivity type for accumulating a signal charge flowing from the longitudinal wiring via the contact part;
a second semiconductor layer of a second conductivity type opposite to that of the first conductivity type, the second semiconductor layer provided on the first semiconductor layer;
a third semiconductor layer of a third conductivity type opposite to that of the first conductivity type, the third semiconductor layer provided under the first semiconductor layer; and
a read transistor between the three-layer structure and the third signal read circuit,
wherein the first semiconductor layer comprises: a first portion whose thickness is smaller or whose impurity density is lower; and a second portion whose thickness is larger or whose impurity density is larger than that of the first portion,
the potential barrier part comprises the first portion of the first semiconductor layer, and
the electric charge accumulating part comprises the second portion of the first semiconductor layer, and
wherein a terminal on the side of the potential barrier part of the first semiconductor layer is electrically connected to the contact part, and a terminal on the side of the electric charge accumulating part of the first semiconductor layer is electrically connected to a source of the read transistor.

6. The photoelectric conversion film laminated color solid-state imaging apparatus according to claim 1,
wherein the first photodiode and the second photodiode are laminated in a direction of depth of the semiconductor substrate.

7. The photoelectric conversion film laminated color solid-state imaging apparatus according to claim 1,
wherein the first photodiode and the second photodiode are arranged in a checkered pattern on a surface of the semiconductor substrate,
a first color filter transmitting the incident light of the first light and blocking the incident light of the second light is provided above the first photodiode, and
a second color filter transmitting the incident light of the second light and blocking the incident light of the first light is provided above the second photodiode.

8. The photoelectric conversion film laminated color solid-state imaging apparatus according to claim 1,
wherein the first color is blue, the second color is red and the third color is green.

\* \* \* \* \*